Dec. 5, 1961 R. A. KIRBY 3,011,855

SEISMIC RECORDING APPARATUS

Filed July 2, 1956

Robert A. Kirby Inventor

By W. O. Heilman Attorney 3,011,855
Patented Dec. 5, 1961

1

3,011,855
SEISMIC RECORDING APPARATUS

Robert A. Kirby, Tulsa, Okla., assignor, by mesne assignments, to Jersey Production Research Company Filed July 2, 1956, Ser. No. 595,382
6 Claims. (Cl. 346—74)

The present invention relates to an improved apparatus for recording electrical signals in the form of magnetic traces. More particularly, the invention relates to a drum-type recorder wherein a magnetic tape recording medium is mounted on the surface of the drum, and wherein a bank of magnetic recording heads engages and moves relative to the drum. The invention especially concerns an improved means for mounting an integral bank of magnetic recording heads with respect to a magnetic tape drum recorder wherein records of improved quality are obtainable. The invention is particularly directed toward an improved apparatus for recording seismic signals.

The use of magnetic means for recording information is well known in the art, and ever increasing in magnitude. Briefly, the technique of magnetic recording consists in altering the magnetic characteristics of a magnetizable material so as to provide a more or less permanent record of desired information. For example, the technique is widely employed by the petroleum industry in seismic prospecting operations. In this application of the technique the electrical signals developed by geophones or other seismic transducers are transmitted to recording heads which engage and move relative to a magnetizable record medium. The movement between the recording heads and the record medium is carefully calibrated and controlled so that an accurate time record of the seismic signals is obtained.

The use of magnetic recording in petroleum prospecting operations affords a number of outstanding advantages which make this technique extremely attractive in this application. The records obtained are reproducible in character and are relatively easy to transport, handle and store. Furthermore, the recording apparatus obviates the need for developing equipment or printing equipment which is usually necessary with other recording methods. Still another advantage of this technique lies in the fact that the individual magnetic trace records do not overlap one another, and they are not therefore subject to difficult interpretation as is very often the case with other recording techniques.

Along with the above advantages, however, the use of magnetic recording is accompanied by certain disadvantages; and it is an object of the present invention to overcome and avoid these disadvantages. For example, it is customary and desirable in recording seismic signals to employ relatively slow movement of the magnetic recording medium with respect to the recording head. This slow movement requires that extremely good contact always be maintained between the recording heads and the recording medium; otherwise records of poor quality are obtained.

In an effort to obtain good head-to-magnetic medium contact, some parties have resorted to recording systems and apparatus in which the heads are individually mounted and wherein the contact force of the heads on the recording medium are individually adjusted. These methods and apparatus, however, generally require considerable spacing between the individual heads with the result that the recording apparatus and medium become unduly large. The recording medium, therefore, becomes expensive; the recording equipment becomes bulky and its speed difficult to control; and the amount of manual adjustment and maintenance of such equipment becomes excessive and undesirable.

2

Accordingly, it is an object of the present invention to provide a magnetic recording system wherein a plurality of magnetic information traces may be simultaneously recorded in a side-by-side relation on a moving magnetic record medium. It is a particular object of the invention to provide a magnetic recording apparatus wherein a plurality of recording heads are permanently mounted in a single integrated bank and wherein a minimum degree of manual adjustment is required to obtain uniform and desirable contact of the individual heads on the recording medium. It will be noted that multi-channel recording heads containing up to as many as 20 or more separate trace heads are manufactured and commercially available; but as yet no completely satisfactory recording apparatus has been developed for utilizing these heads. It is a particular object of the invention to provide a recording apparatus which is especially adapted to utilize heads of this type and to provide a degree of adjustment which is substantially equal in quality to the adjustments that are possible with individually mounted heads.

These and other related objectives of the invention are obtained by employing a drum-type recorder which is adapted to receive on the surface of the drum a conventional magnetic tape. The magnetic heads which engage the tape are arranged in one or more integrated banks of heads around the periphery of the drum; and the individual banks of heads are separately supported in a gimbal-like manner relative to the drum. Thus, each bank of heads is essentially free floating or freely moveable relative to the recording drum; and it is possible to continuously maintain a predetermined desired loading of the bank relative to the tape on the drum. Adjustments are also provided to provide longitudinal and lateral movement of each bank relative to the magnetic tape.

Having thus generally described the nature of the invention, attention is now directed toward a consideration of the drawing wherein a preferred embodiment of the invention is set forth.

FIGURE 1 of the drawing is a perspective view of a dual recording bank apparatus wherein one bank structure has been exploded to better illustrate the structure of the banks.

Figure 2:
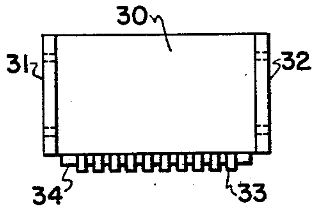
FIGURE 2 is a front view of a multi-channel record head or bank such as is employed in the apparatus of FIGURE 1.
Figure 3:
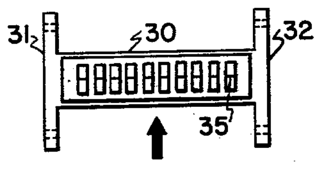
FIGURE 3 is a bottom view of the bank of FIGURE 2 wherein the individual recording heads are more clearly illustrated.

In considering the drawing, attention is first directed toward FIGURES 2 and 3 in order to delineate more clearly the type of multi-head recording bank to which the present invention has particular application. As illustrated in these two figures, the bank consists of a central body member 30 secured at each end to flange members 31 and 32. The flange members are provided with suitable bolt holes or equivalent means for supporting the bank as desired. The direction of tape travel past the bank is indicated by an arrow in FIGURE 3, and it will be assumed that this direction corresponds to the longitudinal disposition of the bank and its heads.

Imbedded within the body member and extending therefrom is a plurality of recording heads 33 which are spaced and separated from one another by an insulating material 34. Conveniently, the insulating material is a synthetic resin or equivalent material which is nonmagnetic and which possesses sufficient strength, rigidity and other characteristics compatible with magnetic recording practice.

As is well known in the art, each recording head 33 is essentially a small electro-magnet with a very small air gap such as is illustrated by the line 35 in FIGURE 3. As is further well known in the art, it is desirable that the record heads engage a magnetic tape recording medium such that the portions of the individual heads on each side of the air gap engage the tape. It is furthermore desirable—especially at low recording speeds such as are employed in seismic work—that the individual heads never be separated from the recording tape by a distance greater than one-half the dimension of the air gap; otherwise, faulty and erroneous errors are obtained. It is also desirable that the contour of the individual heads be substantially cylindrical at the air-gap portion thereof; and that the contact point between each head and the recording tape be on a line which is a common tangent to the head and the tape.

At this point it should be noted that most conventional forms of magnetic recording apparatus that employ multi-head banks of the type shown in FIGURES 2 and 3 utilize adjustments for positioning the heads in a desired relationship with the recording tape. Thus, an adjustment is usually provided for regulating the thrust of the head bank against the tape; and there is usually also an adjustment provided for aligning the heads relative to the tape so that the heads are substantially tangent to the tape directly at the air gaps in the heads. Once these adjustments are made, the adjustments are locked and are rigidly maintained throughout a recording operation.

While rigid adjustments have heretofore been the accepted means for positioning a head bank relative to a recording tape, it has now been found that a freely moveable head bank provides results that are uniquely and surprisingly superior to the results obtainable with rigid head banks. Tape damage is substantially eliminated, record quality is materially improved, and recording noise is greatly reduced. In accordance with the present invention, mobility of movement is imparted to each head bank by an articulated support wherein moveable joints are employed. A universal-type joint may be used, but two joints providing movement in mutually perpendicular planes are preferred.

Figure 1:
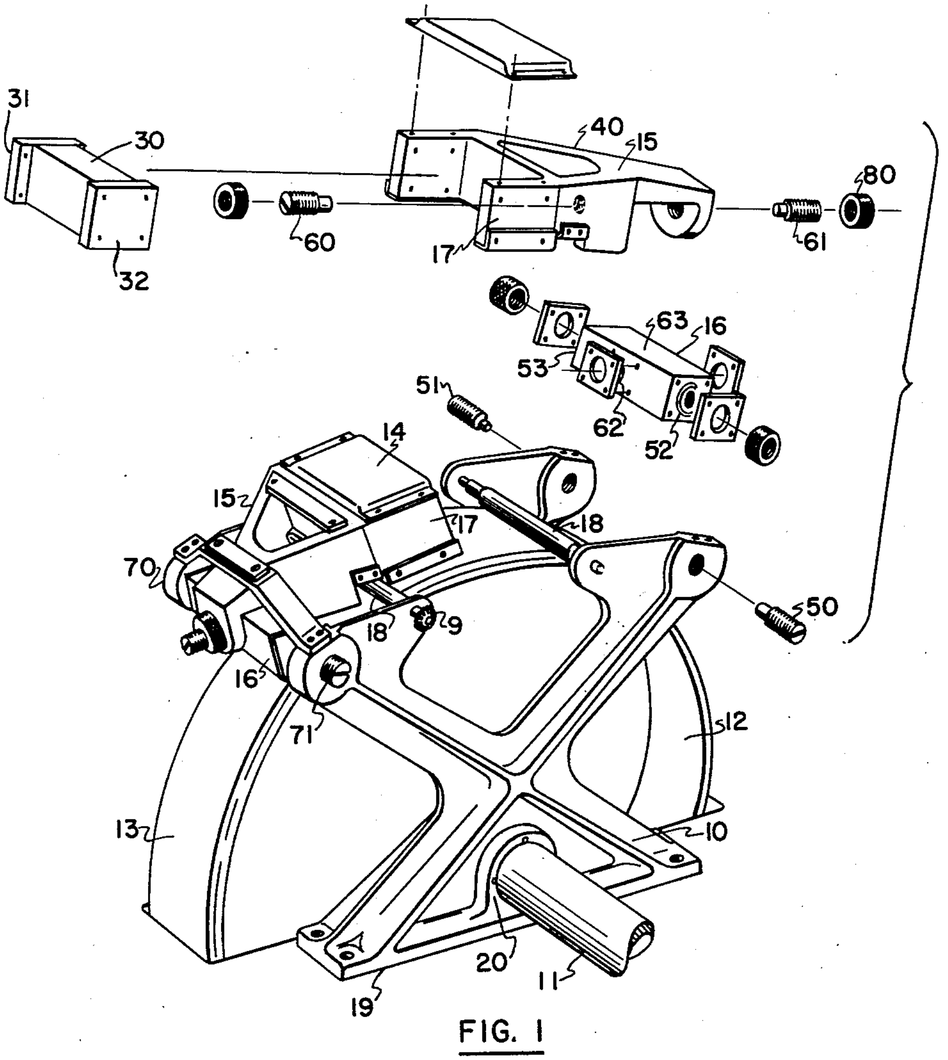

Referring to FIGURE 1, it will be seen that the apparatus in this figure includes a supporting frame 10, drum shaft 11, bearing 20, drum 12, tape 13, recording bank 14, cantilever arm 15, pivot bar 16, yoke 17, lift bar 18 and a base member 19.

As illustrated in FIGURE 1, supporting frame 10 is formed of cross members which are mounted upon and secured to a suitable base member 19. The latter member is not completely illustrated, since its nature and function will be readily apparent to persons skilled in the art. Drum 12 is supported by means of shaft 11, and the shaft in turn is supported from frame 10 by means of bearing 20. Shaft 11 extends to and is driven by any suitable type of drive mechanism. For the purposes of the invention, it is desirable that the drive mechanism be a substantially constant speed device such as a synchronous motor. The drive mechanism has not been illustrated in the figure, since such items are commercially available and are well known and understood by persons skilled in the art.

Drum 12, as shown, is preferably a substantially hollow member consisting, for example, of a rim which is supported from shaft 11 by suitable web members. It is necessary that the outer surface of the drum or rim be maintained as smooth and cylindrically uniform as possible, consistent with the purposes of the invention. For example, in the case of a drum having a diameter of about 10 inches, the outer surface or rim of the drum should have a uniform diameter within a few thousandths of an inch or less.

The width of the drum should be maintained as small as possible consistent with the dimensions of the magnetic head banks. Indeed, it is a particular feature of the invention that the use of integral head banks makes possible the use of much narrower drums than has heretofore been possible with individual mounted heads. The degree of improved speed control, compactness, light weight, etc., of the overall apparatus will be immediately apparent to those skilled in the art.

The drum 12 must be fabricated from a material which is consistent with magnetic recording practices. For example, it is especially desirable that the drum be manufactured from metals such as aluminum, aluminum alloys, magnesium alloys, etc.

The outer surface of the drum 12 may be employed without any surfacing material, but it has been found to be preferred practice to cover the drum with a resilient material such as natural or synthetic rubber. The surfacing material, it has been found, helps to maintain the tape in a fixed position and improves somewhat the contact of the heads with the tape. It has further been found, however, that the surfacing material must not be too soft; otherwise, the tape is apt to stretch thereby introducing timing errors in the records obtained on the tape.

The diameter of the drum necessarily must be made consistent with the length of the tape desired, and convenient mounting means—not shown—are provided for mounting and securing the tape on the drum. Devices of this type are well known in the art, and they are therefore not illustrated in the drawing.

In the apparatus in FIGURE 1 two recording head banks are illustrated—one bank in assembled form, and the other bank in exploded form. As is particularly well illustrated in the exploded illustration, the head bank is mounted and secured within the yoke 17 of the head support 40. An adjustment may be included in the yoke for tilting the head bank about its lateral axis within the yoke, but it has been found that such an adjustment is not necessary in the illustrated form of apparatus.

The yoke 17 with its bank of recording heads, is supported in an articulated manner by means of two sets of pivot bearings. Thus, it will be noted that the head bank in the exploded view may be rotated about a longitudinally disposed axis or pivot point by virtue of movement of pivots 60 and 61 within bearings 62 and 63. Similarly, the bank is capable of rotational movement about a laterally disposed axis by virtue of movement of pivots 50 and 51 within bearings 52 and 53.

At this point it will be noted that the bearings 52, 53, 62 and 63 are positioned within pivot bar 16. The individual bearings may be conventional sleeve bearings, but they are preferably ball bearings, needle bearings, roller bearings or the like.

For the purposes of the invention it will further be noted that each bank of heads should be balanced and suspended such that all of the heads in any given bank engage a tape recording medium substantially instantaneously and with uniform loading on the heads. By observing this relationship, it has been found that substantially improved records may be obtained and that tape damage is greatly minimized.

As will be noted in the figure, each pivot bearing is adjustable in that it can be threaded and locked at various positions within its particular bearing. An extended portion of each pivot is accordingly provided with a screw and a lock nut 80 which permits locking of the overall assembly in any desired position. It will be recognized, of course, that the locking operation merely fixes the position of the bank of recording heads relative to the yoke assembly; and the bank and yoke are still free to move in a free-floating or freely articulated manner.

Having considered in detail the components of the recording assembly that are shown in exploded view in FIGURE 1, a clearer understanding of the construction and functioning of the assembly can be obtained by examining the head bank which is depicted in assembled form. The assembled structure is supported by means of two pivot bearings 70 and 71 from the supporting frame 10, and the recording heads are shown to be elevated above the surface of the recording drum 13 by the action or position of the head lift bar 18. The surface of this bar is contoured to form a cam so that rotation of the bar enables the recording heads to be moved in or out of contact with the recording tape on the drum. A miter gear 9 is illustrated to indicate that the cam lift bar may be actuated by any suitable gear train or lever arrangement as desired.

It will be recognized in FIGURE 1 that the apparatus illustrated there possesses two separate banks of recording heads. This dual head bank construction is preferred, since it enables twice as many record traces to be formed on a single magnetic tape recording medium. It is only necessary that the two banks be staggered laterally with respect to one another and the surface of the tape so that the recorded traces mesh with one another. Expressed otherwise, adjacent traces on the tape are formed by heads of different banks in a staggered manner.

It will be recognized that lateral adjustment of the recording banks with respect to one another is readily possible by means of the adjustable pivot bearings which support the banks from the supporting frame 10. It will further be recognized that the proximity of the traces to one another on the recording tape is limited solely by the ability of the tape to record faithfully separate channels of information. Generally speaking, as many as about 30 channels of information can now be recorded on a magnetic tape which is about 2¼ inches in width.

It is likewise desired that the two head banks be located as close to one another on the tape as is possible. This precaution conserves on the length of tape employed, and it furthermore enables more information to be recorded on any given length of tape. Such considerations will be readily apparent to those skilled in the art.

It will be recognized that the apparatus illustrated in the drawing may be employed in conjunction with a wide variety of conventional seismic components and equipment. Thus, the usual different types of geophones, amplifiers, demodulators, modulators, automatic gain control circuits, automatic shot firing devices, time reference devices, visual playback devices, playback heads, reproducing equipment, and the like may be adapted to and employed with the present apparatus.

In summary, then, the present invention relates to a drum-type magnetic recording apparatus for use in seismic prospecting operations wherein one or more integral banks each containing a plurality of recording heads are supported adjacent the magnetic tape on the drum. The individual banks are free floating in a gimbal-like manner in that they may rotate about lateral and longitudinal axes; and they are additionally adjustable in that their supporting bearings permit lateral and longitudinal predetermined fixed movements of the banks. Recording speeds—i.e. tape movements past the recording heads—of the order of about 3 to 10 inches per second and preferably about 7½ inches per second are contemplated. The banks of heads are preferably of a type in which the individual heads are arranged in a side-by-side linear array, although it is contemplated that banks containing two or more arrays of heads may be employed.

What is claimed is:

1. In a magnetic-type apparatus for recording seismic signals, the combination which comprises a base member, a rotatable drum supported from said base member, a recording medium extending around the cylindrical surface of said drum, an articulated cantilever support member supported at one end from said base member, a unitary bank of magnetic recording heads arranged side-by-side in a linear array and attached to the other end of said articulated member in a manner to contact said recording medium along said drum, pivot bearings at one joint in said articulated member forming a first axis of free rotation for said bank substantially parallel to the axis of said drum, and pivot bearings at a second joint in said articulated member providing a second axis of free rotation for said bank lying in a plane substantially normal to said drum axis and said first axis.

2. An apparatus as defined in claim 1 in which the pivot bearings are axially adjustable to provide predetermined displacements of said first and second axes along their respective lengths.

3. In a multi-channel magnetic-type recorder including a rotatable drum adapted to receive a magnetic recording medium around its periphery, the improvement which comprises a plurality of magnetic recording heads arranged in a side-by-side relation in an integral bank, articulated supporting means adapted to contact said heads against said recording medium to record a plurality of channels thereon upon rotation of said drum, said supporting means being jointed to enable said bank to rotate freely about a first axis substantially parallel to the axis of said drum and about a second axis lying in a plane perpendicular to both the axis of the drum and said first axis.

4. In a multi-channel magnetic-type recording apparatus including a drum having a magnetic recording cylindrical surface and being rotatable about its axis and supported from a base member, the improvement which comprises a cantilever arm supported at a first end from said base member, an integral bank of magnetic recording heads in a side-by-side relation supported from the other end of said arm and adapted to contact against the surface of said drum, first pivot means in said arm enabling said other end to rotate freely about a first axis substantially parallel to the axis of said drum, and second pivot means in said arm enabling said bank to rotate freely about a second axis lying in a plane substantially normal to said drum axis and said first axis.

5. In a multi-channel recording system including a drum rotatable about its axis and a magnetic recording medium extending around the surface thereof, the improvement which comprises an integral bank of permanently mounted magnetic heads adapted to contact said medium and to simultaneously record a plurality of channels in a side-by-side relation thereon upon rotation of said drum, said bank having a longitudinally disposed axis corresponding in direction to the direction of movement of said recording medium past said bank, supporting means for said bank articulated to enable said bank to rotate freely and simultaneously about its longitudinally disposed axis and also about an axis parallel to the axis of the drum and spaced from said drum axis and said bank.

6. In a multi-channel recording system including a drum rotatable about its axis and a magnetic recording medium extending around the surface thereof, the improvement which comprises an integral bank of magnetic heads adapted to contact said medium and to simultaneously record a plurality of channels in a side-by-side relation thereon upon rotation of said drum, said bank having a longitudinally disposed axis correspondnig in direction to the direction of movement of the surface of said drum past said bank, a cantilevered arm supported at one end and supporting said bank at its other end, said arm pivoted freely about a first axis substantially parallel to the axis of said drum and also pivoted freely about said longitudinally disposed axis of said bank.

References Cited in the file of this patent

UNITED STATES PATENTS

| | | |
|---|---|---|
| 2,535,480 | Begun | Dec. 26, 1950 |
| 2,683,038 | Saliba et al. | July 6, 1954 |
| 2,721,743 | Erikson et al. | Oct. 25, 1955 |
| 2,769,037 | Dank | Oct. 30, 1956 |
| 2,769,866 | Kornei | Nov. 6, 1956 |
| 2,783,311 | Scott | Feb. 26, 1957 |

FOREIGN PATENTS

| | | |
|---|---|---|
| 120,302 | Australia | Feb. 26, 1957 |
| 638,858 | France | Dec. 22, 1926 |
| 764,434 | Great Britain | Dec. 28, 1956 |
| 1,099,037 | France | Mar. 16, 1955 |